United States Patent [19]
Bailey

[11] 3,747,988
[45] July 24, 1973

[54] PROCESS FOR THE STABILIZATION OF ACRYLONITRILE BY DISTILLATION WITH A NITROXIDE

[75] Inventor: Hubert Charles Bailey, London, England

[73] Assignee: BP Chemicals Limited, London, England

[22] Filed: Oct. 4, 1971

[21] Appl. No.: 186,469

[30] Foreign Application Priority Data
Oct. 5, 1970 Great Britain .................. 47,169/70

[52] U.S. Cl. .......................... 203/8, 203/57, 203/58, 260/465.9
[51] Int. Cl. ......................................... C07c 121/32
[58] Field of Search ...................... 203/8, 9, 57, 58; 260/465.9

[56] References Cited
UNITED STATES PATENTS
2,758,131  8/1956  Couvillon ......................... 260/465.9
3,354,054  11/1967  Sennewald et al. ............... 260/465.9
3,418,300  12/1968  Nakajima et al. ................. 260/465.9

Primary Examiner—Wilbur L. Bascomb, Jr.
Attorney—Brocks, Haidt & Haffner

[57] ABSTRACT

A process for the recovery of acrylonitrile by distillation by adding to the distillation feedstock a nitroxide having the essential skeletal structure:

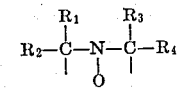

wherein $R_1$, $R_2$, $R_3$, and $R_4$ are alkyl groups and no hydrogen is bound to the remaining valancies on the carbon atoms bound to nitrogen.

A preferred nitroxide is 2,2,6,6 - tetramethyl piperid-4-one-1-oxyl which may be used in the form of its clathrate compound with straight chain hydrocarbons.

10 Claims, No Drawings

PROCESS FOR THE STABILIZATION OF ACRYLONITRILE BY DISTILLATION WITH A NITROXIDE

This invention relates to a process for the stabilisation of acrylonitrile.

Processes for the production of acrylonitrile by the vapour phase reaction of propylene or acrolein with ammonia and molecular oxygen in the presence of a solid catalyst are well known. In the working up of the acrylonitrile product it has been found that the acrylonitrile tends to polymerise especially under distillation conditions even when conventional inhibitors e.g., hydroquinone, oxygen etc., are present. Polymer deposits form in the distillation columns and in the interconnecting lines, particularly in "dead-spaces" or vapour-lines, which are not continuously washed with condensate. These deposits interfere with the efficient operation of the plant and eventually build up to such an extent that the plant must be shut down for cleaning. Shut downs can occur at frequent intervals and the resulting loss of production can be considerable.

The polymer is produced by free radical chain polymerisation of the acrylonitrile. In the presence of oxygen, peroxy radicals are formed which lead to the formation of acrylonitrile poly-peroxides. These are unstable and break down to radical species which thus autocatalyse the oxidation. When the oxygen present in the system is consumed these radical species derived from the polyperoxide can then initiate homopolymerisation of the acrylonitrile. Thus when small traces of oxygen are present in a distillation column, and it is very difficult to exclude oxygen entirely, the net result may be the formation of small amounts of polyperoxide which can then initiate a considerably larger quantity of homopolymerisation. Though it is considered that a major part of the polymerisation occurring in distillation columns may be initiated by such trace amounts of oxygen the successful application of the invention disclosed here does not depend on the mode of initiation of the free radical chains.

We have discovered that certain nitroxides are particularly suitable stabilisers for acrylonitrile under distillation conditions. They inhibit polymerisation at elevated temperatures and act in the absence of oxygen although they can also tolerate the presence of oxygen and do not give undesirable compounds when the latter is present.

It will be appreciated that the ability of the nitroxide to function both in the presence and absence of oxygen is a marked improvement over the prior art in which a choice has to be made between an oxygen-free and an oxygen-containing system, and in which any change from one system to the other would lead to highly undesirable results.

Stable radicals of the formula:

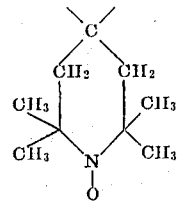

are known from the publication by O.L. Lebedev and S.N. Kazarnovski in Tr.po.khim.Tekhnol. 2,649-656, (1959).

Stable radicals can in principle both initiate and terminate radical polymerisation reactions. With increasing temperature, their initiating action will become relatively more pronounced, because termination is a radical/radical reaction, requiring zero or a low energy of activation, while the addition of a radical to a monomer usually requires energy of activation exceeding 5 Kcal./Mol.

Thus, although stable nitroxide radicals are known it is not obvious that the nitroxides of the present application would be particularly effective as polymerisation inhibitors at relatively high temperatures (60°C) and above), both in the presence and absence of water and oxygen nor that they would possess volatilities sufficient to confer inhibition to the vapour and to the "dead-spaces" in the columns.

Thus according to the present invention there is provided a process for the recovery of acrylonitrile by distillation, which process comprises adding to the distillation feedstock a nitroxide having the essential skeletal structure:

wherein $R_1$, $R_2$, $R_3$ and $R_4$ are alkyl groups and no hydrogen is bound to the remaining valencies on the carbon atoms bound to nitrogen.

The alkyl groups $R_1$ to $R_4$ may be the same or different, and preferably contain 1 to 15 carbon atoms. It is particularly preferred to use nitroxides having the essential skeletal structure (1) in which $R_1$ to $R_4$ are methyl, ethyl or propyl groups.

The remaining valencies of the carbon atoms in the essential skeletal structure which are not satisfied by $R_1 - R_4$ or nitrogen may be satisfied by any atom or group except hydrogen which can bond covalently to carbon although some groups may reduce the stabilizing power of the nitroxide structure (1) and are undesirable. Examples of suitable atoms or groups are halogen, cyanide

when R is alkyl or aryl,

, —S—C$_6$H$_5$, -S-COCH$_3$, — OCOCH$_3$, —OCOC$_2$H$_5$ alkenyl where the double bond is not in conjugation with the group

and alkyl. The two remaing valencies which are not satisfied by $R_1$ to $R_4$ or nitrogen may also form part of a ring. Examples of suitable compounds having the essential skeletal structure (I) and in which the remaining valencies of (I) form part of the ring are pyrrolidine-1-oxyls and piperidine-1-oxyls. A particular example of the essential skeletal structure (I) forming part of a ring is 2,2,6,6-tetramethyl-4-hydroxy-piperidine-1-oxyl. Where the remaining valencies of (I) are satisfied by alkyl groups $R_5$, $R_6$ to give a compound of formula:

(II)

the groups $R_5$ and $R_6$ preferably contain 1 to 15 carbon atoms. Examples of suitable groups $R_5$ and $R_6$ are methyl, ethyl and propyl groups. A specific example of a suitable compound having the essential structure (II) is di-tert-butyl nitroxide.

Although as we have indicated above it is possible to stabilize acrylonitrile in the presence of oxygen, for the very best results it is preferred to exclude oxygen and oxygen-yielding materials. In the presence of oxygen, peroxy compounds of acrylonitrile tend to be formed, which on decomposition lead to the consumption of nitroxide. However, the compositions of the present invention will still be stabilized against polymerization in oxygen concentrations in the acrylonitrile of up to those present in a monomer in equilibrium with air at atmospheric pressure. This is extremely useful as there is therefore no need to purge the acrylonitrile with inert gas to remove dissolved oxygen. This is in marked contrast to monomers stabilized with some other inhibitors effective in the absence of oxygen. Thus nitric oxide may be used to inhibit the polymerisation of monomers in the absence of oxygen but where oxygen is present the inhibiting action of nitric oxide is lost.

Suitably the nitroxide is employed in a concentration in the range 1 to 1000 parts per million parts of acrylonitrile.

The nitroxides are suitable for use over a wide range of temperatures, but typically in distillation columns the temperature is preferably in the range 60° to 120°C.

A preferred nitroxide, 2,2,6,6-tetramethyl-piperid-4-one-1-oxyl, may be used in the form of its clathrate compounds with straight chain hydrocarbons e.g. the 2,2,6,6-tetramethyl-piperid-4-one-1-oxyl derivative of $C_{10-20}$ n-paraffins.

The nitroxides of the present invention are particularly suitable for acrylonitrile stabilisation, because they are sufficiently volatile to confer inhibition to the vapour phase, as encountered in a distillation column, without, at the same time, contaminating the acrylonitrile distillate to an undesirable extent.

It is generally desirable to be able to remove inhibitor from the acrylonitrile, particularly if the acrylonitrile is to be used as a monomer in a polymerisation process. In this context a further surprising but useful feature of the present invention is that, if desired, the nitroxide inhibitors may be removed from the acrylonitrile by treatment with an acidic ion-exchange resin, for example amberlyst.

The nitroxides may be prepared by the method disclosed by O.L. Lebedev and S.N. Kazarnovski, Tr. po Khim. i Khim. Tekhnol. 2, 649-656 (1959).

The invention is illustrated by the following examples:

EXAMPLE 1

In an accelerated inhibition test, pure acrylonitrile containing as polymerisation initiator 1,1-azobis (cyclohexane nitrile) ($2.5 \times 10^{-4}$ mole/1) and as inhibitor, 2,2,6,6-tetramethyl-4-hydroxy-piperidine-1-oxyl ($2 \times 10^{-4}$ mole/1), was heated at 100°C in a sealed tube. The polymerisation induction period was 90 minutes. From the known rate of formation of radicals from the initiator, it was calculated that the radical terminating efficiency of the nitroxide was 98 percent.

Comparison Test 1

The procedure of Example 1 was repeated except that no nitroxide was added. The inhibition period was only 3–4 minutes.

The results of this test compared with those of Example 1 demonstrate the efficiency of 2,2,6,6-tetramethyl-4-hydroxypiperidine-1-oxyl as a polymerisation inhibitor for acrylonitrile.

EXAMPLE 2

This example demonstrates the use of a clathrate as inhibitor. An accelerated test, carried out as in Example 1, but with the n-hexadecane clathrate of 2,2,6,6-tetramethyl piperid-4-one-1-oxyl ($2 \times 10^{-4}$ mole/$l$) as inhibitor gave an induction period of 80 minutes. The efficiency of radical termination by the nitroxide was 90 perent.

EXAMPLE 3

In a simulation of a portion of a distillation column, acrylonitrile containing the nitroxide inhibitor was heated in a reboiler under reflux, and a small sample tube of unstabilised pure acrylonitrile was suspended in the vapour-space. The sample tube was open at the upper end to allow contact with the surrounding vapour, but entry of the liquid reflux was prevented. A slow bleed of air was added to the reboiler, below the liquid level. The rate of addition of air was approximately one one-hundred and fiftieth of the boil-uprate of the acrylonitrile.

With 50 ppm of the hydroxy-nitroxide in the reboiler, no polymer was formed in the tube of unstabilised acrylonitrile after intermittent operation over 6 weeks.

Comparison Test 2

The procedure of Example 3 was repeated except that in one test there was no inhibitor, and a second test, hydroquinone (50 ppm) was added to the boiler. The onset of polymerisation in both sample tubes was evident after only 4 to 5 days.

The results of Example 3 compared with those of Comparison Test 2 demonstrate the effectiveness of nitroxides as polymerisation inhibitors in the vapour phase.

I claim:

1. A process for the recovery of acrylonitrile by distillation which process comprises adding to the distillation feedstock a nitroxide radical having the essential structure

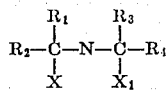

wherein each of $R_1$, $R_2$, $R_3$ and $R_4$ is alkyl containing 1 to 15 carbon atoms and X and $X_1$ is the same or different and is alkyl, halogen, cyanide,

, wherein R is either alkyl or aryl,

, — S — $C_6H_5$, —S—$COCH_3$, —$OCOCH_3$, —O-$COC_2H_5$, alkenyl wherein the double bond is not in conjugation with the group

, or X and $X_1$ taken together form part of a ring.

2. A process as claimed in claim 1 wherein the groups $R_1$ to $R_4$ are alkyl groups selected from methyl, ethyl and propyl groups.

3. A process according to claim 1 wherein each of X and $X_1$ is methyl, ethyl or propyl.

4. A process according to claim 1 wherein the nitroxide radical of said structure is di-tert.-butyl nitroxide.

5. A process according to claim 1, wherein X and $X_1$ together form part of a ring.

6. A process according to claim 5, wherein said nitroxide radical is selected from the group consisting of piperdine-1-oxyls and pyrrolidine-1-oxyls.

7. A process according to claim 6 wherein said nitroxide radical is 2,2,6,6-tetramethyl-4-hydroxy-piperidine-1-oxyl.

8. A process according to claim 6 wherein said nitroxide radical is 2,2,6,6-tetramethyl-4-one-1-oxyl.

9. A process according to claim 8 wherein said 2,2,6,-6-tetramethyl-piperid-4-one-1-oxyl is in the form of its clathrate compounds with straight chain hydrocarbons selected from $C_{10}$ — $C_{20}$ —n-paraffins.

* * * * *

PO-1050
(5/69)

UNITED STATES PATENT OFFICE
CERTIFICATE OF CORRECTION (BP 3180)

Patent No. 3,747,988      Dated July 24, 1973

Inventor(s) HUBERT CHARLES BAILEY

It is certified that error appears in the above-identified patent and that said Letters Patent are hereby corrected as shown below:

Col. 4, line 31, correct the spelling of "per cent".

Original claim 10 was omitted. Said claim 10 should be printed to read as follows:

--10. A process as claimed in Claim 1 wherein the nitroxide is employed at a concentration in the range of 1 to 1000 parts per million parts of acrylonitrile and the distillation temperature is in the range 60° to 120°C.--

Signed and sealed this 20th day of November 1973.

(SEAL)
Attest:

EDWARD M. FLETCHER, JR.
Attesting Officer

RENE D. TEGTMEYER
Acting Commissioner of Patent